(12) United States Patent
Ahrens

(10) Patent No.: US 9,187,614 B2
(45) Date of Patent: Nov. 17, 2015

(54) BINDING AGENT FREE-PIGMENT PREPARATIONS CONTAINING PHOSPHORIC ACID ESTER

(71) Applicant: Hendrik Ahrens, Kriftel (DE)

(72) Inventor: Hendrik Ahrens, Kriftel (DE)

(73) Assignee: Clariant Finance (BVI) Limited, Tortola (BV)

( * ) Notice: Subject to any disclaimer, the term of this patent is extended or adjusted under 35 U.S.C. 154(b) by 0 days.

(21) Appl. No.: 14/434,025

(22) PCT Filed: Sep. 4, 2013

(86) PCT No.: PCT/EP2013/002651
§ 371 (c)(1),
(2) Date: Apr. 7, 2015

(87) PCT Pub. No.: WO2014/056562
PCT Pub. Date: Apr. 17, 2014

(65) Prior Publication Data
US 2015/0259503 A1   Sep. 17, 2015

(30) Foreign Application Priority Data

Oct. 9, 2012 (DE) .................... 10 2012 019 788

(51) Int. Cl.
| | |
|---|---|
| C09D 11/03 | (2014.01) |
| C09D 11/033 | (2014.01) |
| C09B 67/00 | (2006.01) |
| C09D 17/00 | (2006.01) |
| C09D 4/00 | (2006.01) |
| C09D 5/00 | (2006.01) |
| C08K 3/22 | (2006.01) |
| C08K 5/3417 | (2006.01) |
| C08K 5/357 | (2006.01) |
| C08K 5/23 | (2006.01) |
| C08K 5/46 | (2006.01) |
| C09D 11/00 | (2014.01) |

(52) U.S. Cl.
CPC ... *C08K 3/22* (2013.01); *C08K 5/23* (2013.01); *C08K 5/3417* (2013.01); *C08K 5/357* (2013.01); *C08K 5/46* (2013.01); *C09D 11/00* (2013.01); *C08K 2003/2206* (2013.01); *C08K 2003/2224* (2013.01); *C08K 2003/2227* (2013.01); *C08K 2003/2231* (2013.01); *C08K 2003/2251* (2013.01); *C08K 2003/2268* (2013.01); *C08K 2003/2289* (2013.01)

(58) Field of Classification Search
CPC .... C09D 11/03; C09D 11/033; C09D 17/001; C09D 17/003; C09D 17/004; C09D 17/007; C09D 17/008; C09D 5/00; C09D 4/00; C09B 67/0066

USPC .......... 106/31.75, 31.86, 483, 499, 503, 504, 106/287.26, 287.29, 287.3
See application file for complete search history.

(56) References Cited

U.S. PATENT DOCUMENTS

| | | | | |
|---|---|---|---|---|
| 4,350,535 | A * | 9/1982 | Ishijima et al. | 106/503 |
| 4,419,134 | A * | 12/1983 | Ishijima et al. | 106/642 |
| 4,453,982 | A * | 6/1984 | Wilfinger et al. | 106/403 |
| 4,456,485 | A * | 6/1984 | Iyengar et al. | 106/31.75 |
| 4,725,317 | A * | 2/1988 | Wheeler | 106/403 |
| 4,872,916 | A * | 10/1989 | Latosky | 106/503 |
| 4,986,851 | A * | 1/1991 | Dietz et al. | 106/503 |
| 5,039,343 | A * | 8/1991 | Umeda et al. | 106/404 |
| 5,057,156 | A * | 10/1991 | Kuwajima et al. | 106/403 |
| 5,324,354 | A * | 6/1994 | Jesse et al. | 106/31.75 |
| 6,352,586 | B1 * | 3/2002 | Lassmann | 106/504 |
| 8,968,462 | B2 * | 3/2015 | Ahrens | 106/499 |
| 2005/0235876 | A1 * | 10/2005 | Reisacher et al. | 106/499 |
| 2015/0175780 | A1 * | 6/2015 | Ahrens | 106/503 |

* cited by examiner

*Primary Examiner* — Helene Klemanski
(74) *Attorney, Agent, or Firm* — Tod A. Waldrop

(57) ABSTRACT

Phosphoric acid ester as dispersing agents in binding agent free-pigment preparations. The invention relates to aqueous, binding agent free-pigment preparations, containing (A) 1.0-75.0 wt.-% of at least one organic or inorganic white or colored pigment or a mixture of different organic and inorganic white or colored pigments, (B) 0.01 to 8.0 wt. % of at least one phosphoric acid ester of formula (IV), wherein R represents a linear or cross-branched, saturated or unsaturated $C_8$ to $C_{18}$-aliphatic hydrocarbon group, M represents a hydrogen atom or a sodium, potassium or ammonium ion, n is an integer of between 0-20 and m is an integer of between 0-20, (C) 0.01-12.0 wt.-% of a non-ionic surfactant which is a fatty acid ethanol amide ethoxylate of formula (V), wherein a represents an integer of between 3-50, and $R^1$ represents $C_7$-$C_{21}$-alkyl or -alkenyl and (G) water.

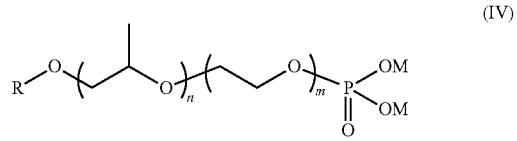

(IV)

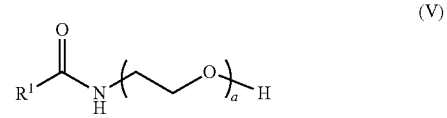

(V)

19 Claims, No Drawings

BINDING AGENT FREE-PIGMENT PREPARATIONS CONTAINING PHOSPHORIC ACID ESTER

The present invention relates to aqueous, binder-free pigment preparations which comprise phosphoric esters as dispersants, and also to their use for coloring macromolecular materials of all kinds, such as, for example, fiber materials, paper stock coloring, coating materials, paints, inks, and the use thereof for the printing of two-dimensional sheetlike structures such as, for example, paper, cardboard packaging, plastics, textiles, and leather.

For the coloring of macromolecular materials, more particularly of inks and paints, aqueous, binder-free pigment preparations are produced with organic or inorganic pigments. In home improvement stores and decorating supply stores, these pigment preparations are used as tinting pastes, and, with the aid of metering and tinting units, are added to aqueous and solventborne paints and varnishes in order to produce shades that match customer requirements. Tinting pastes typically contain pigment concentrations in a broad concentration range of 1 to 75 mass %.

Despite the fact that in the prior art a multitude of compounds are proposed for use as suitable wetting agents and dispersants, there is repeatedly in practice a lack of effective dispersants for pigment dispersions that satisfy the requirements of sedimentation stability, rheological behavior, pigment color yield, and minimal behavior in terms of human and environmental toxicology. Furthermore, award guidelines for environmental seals restrict the use of known wetting and dispersing assistants, and so the skilled person is continually on a search for new dispersants and combinations in order to produce liquid, stable, aqueous pigment preparations.

The object of the present invention was to produce stable and fluid, alkylphenol-free, aqueous pigment preparations which over a relatively long time show no sedimentation of the pigments used, and with which aqueous and solventborne paints, varnishes, and stains can equally be colored. In the tinting of aqueous varnishes and paints, more particularly emulsion paints, silicate emulsion paints, and aqueous silicone resin paints, the pigment preparations of the invention ought not to show any rubout problems.

Furthermore, the aqueous pigment preparations are also to be compatible with solventborne varnishes, to be homogeneously dispersible in the varnish by mixing, stirring, or shaking, and to produce a smooth, even paint outcome when applied by brush or roller to surfaces. Also serving for the compatibility of the aqueous pigment preparations is the rubout test, which is carried out in manner described in U.S. Pat. No. 3,840,383.

DE-3914384 teaches pigment preparations comprising (A) a finely divided pigment,
(B) 1 to 20 wt %—based on the preparation—of at least one colorant which has at least one external basic group,
(C) 3 to 30 wt %—based on the preparation—of at least one phosphoric ester from the group of dialkyl-, trialkyl-, diaryl-, triaryl-, alkylarylphosphoric esters or the group of the acidic or neutral phosphoric esters based on fatty alcohol-ethylene oxide adducts, fatty alcohol-propylene oxide adducts, polypropylene glycol, polyethylene glycol or of block copolymers based on propylene oxide and ethylene oxide, and
(D) optionally further customary auxiliaries in pigment preparations.

DE-A-3627023 teaches a pigment dispersion consisting of
(A) 10 to 80 wt % of a pigment,
(B) 2 to 20 wt % of one or more alkyl glycol ether sulfates of the general formula (I)

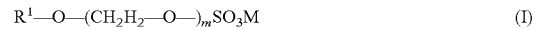

$$R^1\text{—O—}(CH_2H_2\text{—O—})_m SO_3M \qquad (I)$$

in which
$R^1$ is an alkyl or alkenyl radical having 6 to 28 C atoms,
m is an integer from 1 to 20, and
M is a physiologically unobjectionable cation,
(C) 0.1 to 10 wt % of one or more phosphoric esters of the general formula (II)

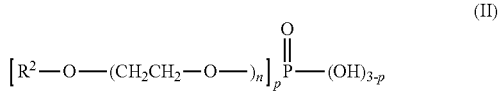

$$\left[R^2\text{—O—}(CH_2CH_2\text{—O—})_n\right]_p \overset{O}{\underset{\|}{P}}\text{—}(OH)_{3-p} \qquad (II)$$

in which
$R^2$ independently at each occurrence is an alkyl or alkenyl radical having 4 to 28 C atoms,
n independently at each occurrence is an integer from 0 to 10, and
p is an integer from 1 to 3,
(D) 0 to 60 wt % of a physiologically unobjectionable water retention agent,
(E) 0 to 5 wt % of customary additives, and
(F) 0 to 80 wt % of water,
the sum total of the constituents (A), (B), (C), (D), (E), and (F) present amounting to 100 wt % of the dispersion.

U.S. Pat. No. 4,456,485 teaches that readily dispersible alkali metal pigments with high color strength are obtained when the pigment is precipitated in the presence of
(A) primary, secondary or tertiary aliphatic amines,
(B) N-alkylamino alkanoic acid,
(C) diaryl- or triarylamines,
(D) acidic or neutral aliphatic esters of phosphoric acid,
(E) monoesters of sulphuric acid with fatty alcohols, fatty alcohol-EO adducts or alkylphenol-EO adducts,
(F) an alkane- or alkene-sulfonic acid on a dialkyl sulfimide,
(G) EO adducts with alkylphenols, alkanols, or alkylamines,
(H) polypropylene glycol or PO/EO block copolymers on alkanediols or alkane-polyols
or in the presence of mixtures of these compounds (A)-(H), and is isolated.

DE-A-3020073 teaches a water-dispersible paste composition of metal powders, characterized by
(A) metal powders, and
(B) 0.1 to 20 wt % (based on the weight of the metal powders) of at least one organic phosphoric ester of the general formula (III) below

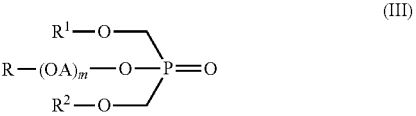

in which
R is a $C_{6-24}$ alkyl radical, a $C_{6-24}$ alkenyl radical, or an aryl radical which carries at least one $C_{6-24}$ alkyl substituent or at least one $C_{6-24}$ alkenyl substituent,
A is a $C_{2-4}$ alkylene radical, m is an integer from 0 to 20, and R¹ and R² independently of one another are each a hydrogen atom, a $C_{1-24}$ alkyl radical, a $C_{1-24}$ alkenyl radical, a $C_{6-24}$ aryl radical, or a radical R—(OA)$_m$, in which R, A, and m have the same definition as above.

In order to allow compatibility of the aqueous pigment preparations for as great as possible a number of paints and varnishes, the intention, furthermore, is to avoid the use of binders in the production of the pigment preparations of the invention.

A further object of the invention was to provide aqueous pigment preparations featuring low potential in terms of human toxicology, and posing a low level of environmental hazard. Volatile organic compounds having a boiling point of <250° C. (VOC contents) are not to be added explicitly to the aqueous pigment preparations, and are to be present only in small amounts, in the form of unreacted synthesis raw materials or as products of secondary reactions.

Surprisingly it has been found that pigment preparations which comprise phosphoric esters of the formula (IV) in combination with nonionic surfactants achieve this object.

The invention accordingly provides aqueous, binder-free pigment preparations comprising (A) 1.0 to 75.0 wt % of at least one organic or inorganic white or chromatic pigment or a mixture of different organic and inorganic white or chromatic pigments, (B) 0.01 to 8.0 wt % of at least one phosphoric ester of the formula (IV),

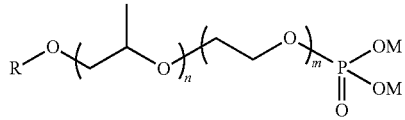

(IV)

in which

R is a linear or branched, saturated or unsaturated $C_8$ to $C_{18}$ aliphatic hydrocarbon radical, M is a hydrogen atom or a sodium, potassium, or ammonium ion, n is an integer from 0 to 20, and m is an integer from 0 to 20, (C) 0.01 to 12.0 wt % of an ethoxylated fatty acid alkanolamide ethoxylate of the formula (V)

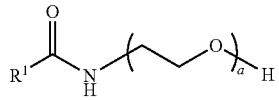

(V)

in which a is an integer from 3 to 50, and

R¹ is $C_7$ to $C_{21}$ alkyl or alkenyl, and (G) water.

The pigment preparation of the invention may further optionally comprise one or more of the following constituents:

(D) 0, preferably 0.01 to 8.0 wt % of clay mineral thickeners selected from natural or alkali-activated montmorillonite phyllosilicate minerals, (E) 0, preferably 0.01 to 20.0 wt % of inorganic fillers, and/or (F) 0, preferably 0.01 to 30 wt % of other auxiliaries customary for producing aqueous pigment preparations, such as additional wetting agents, moisture retainers, solvents, defoamers, rheological additives, preservatives, buffer substances, and pH regulators.

The pigment preparations of the invention are stable to shearing, to drying up, and to storage, produce little or no foam during application, and possess an outstanding rheology.

The pigment preparations of the invention are binder-free. Binders for the purposes of this invention are polymers or resins which are in solution in a suitable solvent and dry physically, chemically, thermally, oxidatively, or with radiation curing. During the drying process, the polymers or resins form films and so bind the pigments and fillers used in a coating material. Since binders also possess dispersing properties, they are popularly used in combination with low molecular weight wetting agents and dispersants for the production of pigment preparations. A disadvantage of the use of a binder for producing pigment preparations is the restriction on the usefulness of the pigment preparations, which are to be compatible with as great as possible a number of different paints and varnishes and with the binders present therein.

Component (A) of the pigment preparations of the invention is preferably a finely divided, organic or inorganic, white or chromatic pigment or a mixture of different such pigments.

An exemplary selection of particularly preferred organic pigments includes carbon black pigments, such as gas blacks or furnace blacks, for example; monoazo and disazo pigments, more particularly the Colour Index pigments Pigment Yellow 1, Pigment Yellow 3, Pigment Yellow 12, Pigment Yellow 13, Pigment Yellow 14, Pigment Yellow 16, Pigment Yellow 17, Pigment Yellow 73, Pigment Yellow 74, Pigment Yellow 81, Pigment Yellow 83, Pigment Yellow 87, Pigment Yellow 97, Pigment Yellow 111, Pigment Yellow 126, Pigment Yellow 127, Pigment Yellow 128, Pigment Yellow 155, Pigment Yellow 174, Pigment Yellow 176, Pigment Yellow 191, Pigment Yellow 213, Pigment Yellow 214, Pigment Red 38, Pigment Red 144, Pigment Red 214, Pigment Red 242, Pigment Red 262, Pigment Red 266, Pigment Red 269, Pigment Red 274, Pigment Orange 13, Pigment Orange 34, or Pigment Brown 41; β-naphthol and naphthol AS pigments, more particularly the Colour Index pigments Pigment Red 2, Pigment Red 3, Pigment Red 4, Pigment Red 5, Pigment Red 9, Pigment Red 12, Pigment Red 14, Pigment Red 53:1, Pigment Red 112, Pigment Red 146, Pigment Red 147, Pigment Red 170, Pigment Red 184, Pigment Red 187, Pigment Red 188, Pigment Red 210, Pigment Red 247, Pigment Red 253, Pigment Red 254, Pigment Red 256, Pigment Orange 5, Pigment Orange 38, or Pigment Brown 1; laked azo and metal complex pigments, more particularly the Colour Index pigments Pigment Red 48:2, Pigment Red 48:3, Pigment Red 48:4, Pigment Red 57:1, Pigment Red 257, Pigment Orange 68, or Pigment Orange 70; benzimidazoline pigments, more particularly the Colour Index pigments Pigment Yellow 120, Pigment Yellow 151, Pigment Yellow 154, Pigment Yellow 175, Pigment Yellow 180, Pigment Yellow 181, Pigment Yellow 194, Pigment Red 175, Pigment Red 176, Pigment Red 185, Pigment Red 208, Pigment Violet 32, Pigment Orange 36, Pigment Orange 62, Pigment Orange 72, or Pigment Brown 25; isoindolinone and isoindoline pigments, more particularly the Colour Index pigments Pigment Yellow 139 or Pigment Yellow 173; phthalocyanine pigments, more particularly the Colour Index pigments Pigment Blue 15, Pigment Blue 15:1, Pigment Blue 15:2, Pigment Blue 15:3, Pigment Blue 15:4, Pigment Blue 15:6, Pigment Blue 16, Pigment Green 7, or Pigment Green 36; anthanthrone, anthraquinone, quinacridone, dioxazine, indanthrone, perylene, perinone, and thioindigo pigments, more particularly the Colour Index pigments Pigment Yellow 196, Pigment Red 122, Pigment Red 149, Pigment Red 168, Pigment Red 177, Pigment Red 179, Pigment Red 181, Pigment Red 207, Pigment Red 209, Pigment Red 263, Pigment Blue 60, Pigment Violet 19, Pigment Violet 23, or Pigment Orange 43; and triarylcarbonium pigments, more particularly the Colour Index pigments Pigment Red 169, Pigment Blue 56, or Pigment Blue 61.

Examples of suitable inorganic pigments are titanium dioxides, zinc sulfides, zinc oxides, iron oxides, magnetites, manganese iron oxides, chromium oxides, ultramarine, nickel or chromium antimony titanium oxides, manganese titanium rutiles, cobalt oxides, mixed oxides of cobalt and aluminum, rutile mixed phase pigments, rare earth sulfides, spinels of cobalt with nickel and zinc, spinels based on iron and chromium with copper, zinc, and manganese, bismuth vanadates, and extender pigments. Used more particularly are the Colour Index pigments Pigment Yellow 184, Pigment Yellow 53, Pigment Yellow 42, Pigment Yellow Brown 24, Pigment Red 101, Pigment Blue 28, Pigment Blue 36, Pigment Green 50, Pigment Green 17, Pigment Black 11, Pigment Black 33, and Pigment White 6. Preference is also frequently given to using mixtures of inorganic pigments. Mixtures of organic with inorganic pigments are likewise frequently used.

Component (B) of the pigment preparations of the invention is a phosphoric ester of synthetic and natural alcohols and/or the alkoxylates thereof, which can be prepared therefrom by reaction with a phosphating reagent.

Alcohols suitable for this purpose are aliphatic linear or branched, saturated or unsaturated $C_8$ to $C_{18}$ alcohols.

Suitable alcohol alkoxylates are prepared by alkoxylating linear or branched, saturated or unsaturated $C_8$ to $C_{18}$ alcohols with up to 20 mol of ethylene oxide and/or propylene oxide. The alkoxylation is carried out using alkaline catalysts such as potassium hydroxide, sodium hydroxide, or calcium hydroxide, which after the polyaddition of the alkoxylates has taken place are neutralized by means of low molecular weight organic acids such as, for example, acetic acid, propionic acid, lactic acid, or longer-chain $C_6$ to $O_{12}$ carboxylic acids.

Mixed alkoxylates may have been alkoxylated either randomly or blockwise, unless described differently below.

In one preferred embodiment a $C_8$ to $C_{18}$ alcohol is reacted with 1 to 20 mol of ethylene oxide and subsequently with a suitable phosphating reagent.

In another preferred embodiment the $C_8$ to $C_{18}$ alcohol is reacted blockwise first with 1 to 20 mol of propylene oxide and then with 1 to 20 mol of ethylene oxide and is then reacted with a suitable phosphating reagent.

Suitable synthesis processes for the phosphating reaction of the alcohols and alcohol alkoxylates use orthophoshoric acid, polyphosphoric acid, phosphorous pentoxide or phosphoryl chloride as phosphating reagent. The phosphoric esters of the alcohols and alcohol alkoxylates are present in the form of mixtures, and the phosphoric esters may be present as monoesters, diesters, and triesters, alongside unreacted alcohol and/or alcohol alkoxylate and phosphating reagent. Depending on the phosphating reagent and the molar ratio that is used of the alcohols or alcohol alkoxylates to the phosphating reagent, phosphoric esters with different compositions are produced. The synthesis conditions are preferably selected so as to maximize the proportion of monophosphoric ester.

Component (C) of the pigment preparations of the invention is a nonionic surfactant selected from the group consisting of fatty acid alkanolamide ethoxylates of the formula (V)

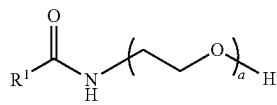

Ethoxylated fatty acid ethanolamides are prepared preferably by reaction of fatty acids with ethanolamine to give the fatty acid ethanolamide, with subsequent addition reaction of ethylene oxide by means of alkaline catalysts such as sodium or potassium methoxide. $R^1$ is preferably an alkyl or alkenyl group having 11 to 19 carbon atoms, and there may also be more than one double bond present. a is an integer from 1 to 100 and is preferably at least 3, more particularly at least 4. Starting from the fatty acid ethanoalmide, ethylene oxide is added on preferably to the terminal hydroxyl group. The addition of ethylene oxide to the nitrogen of the acid amide group takes place to a minor extent in a secondary reaction, and so to a minor extent there are also two polyethylene glycol ether radicals bonded on the nitrogen. Suitable fatty acids for preparing the fatty acid ethanolamides are capric acid, lauric acid, myristic acid, palmitic acids, margaric acid, stearic acid, arachidic acid, behenic acid, palmitoleic acid, oleic acid, and naturally occurring mixtures such as palm kernel oil fatty acid, rapeseed oil fatty acid, sunflower oil fatty acid, soya oil fatty acid, or resin acids such as tall oil fatty acid. The fatty acids used as raw material may be in saturated or unsaturated forms.

Component (D) is a clay mineral thickener based on natural or alkali-activated montmorillonite phyllosilicate minerals. Montmorillonite is the main constituent of bentonite and possesses a high ion exchange capacity. When water is added, the mineral expands by a multiple of the original size, thereby raising the viscosity of the aqueous dispersion. Montmorillonite as clay mineral thickener can be added to the pigment preparation of the invention in order to retard or prevent the settling of organic and inorganic pigments and fillers and the syneresis—that is, the formation of a second phase with a different composition.

Component (E) is an inorganic filler, which may be added to the pigment preparations of the invention in order to raise their density and modify the flow behavior. In the case of volumetric metering and low pigment concentration or lightweight organic pigments, it may be possible that the pigment preparation is difficult to feed into the metering equipment, since the gravitational force is not sufficient to empty the liquid pigment preparation into the paint can. In other cases, at low pigment concentrations, the viscosity of the pigment preparations is too low, leading to dripping. In both cases, colorless inorganic fillers may be added to the pigment preparations of the invention, in order to raise the density of the pigment preparation and to improve the flow behavior. Suitable fillers are calcium carbonates such as naturally occurring chalk and precipitated calcium carbonate, dolomite, natural silicon dioxide (finely ground quartz), fumed and precipitated silicas, kieselguhr, aluminum oxides, aluminum hydroxides, talc, kaolin, mica (potassium aluminum silicate hydrate), barium sulfates such as naturally occurring heavy spars, and precipitated blanc fixe.

Components (F) are further auxiliaries customary for the production of aqueous pigment preparations, such as additional wetting agents, moisture retainers, solvents, defoamers, rheological additives, preservatives, buffer substances, and pH regulators.

Additional wetting agents may be wetting agents based on polysiloxane ethers, such as a methoxypolyethoxypropyltrisiloxane, for example, alkynediol ethoxylates, and fluorosurfactants.

Suitable moisture retainers and solvents are preferably glycol ethers, by which are meant here compounds having ethoxy and/or propoxy groups and having average molar masses of between 200 and 20 000 g/mol, more particularly polyethylene glycol ethers or polypropylene glycol ethers having an average molar mass of between 200 and 20 000 g/mol, mono-, di-, or triethylene glycol, mono-, di-, or tripropylene glycol, methyl-, ethyl-, propyl-, butyl-, or higher alkyl-polyalkylene glycol ethers having 1, 2, 3, or more ethylene glycol or propylene glycol units such as, for example, methoxypropanol, dipropylene glycol monomethyl ether, tripropylene glycol monomethyl ether, ethylene glycol monobutyl ether, diethylene glycol monobutyl ether, butylpolyethylene glycol ether, propylpolyethylene glycol ether, ethylpolyethylene glycol ether, methylpolyethylene glycol ether, dimethylpolyethylene glycol ether, dimethylpolypropylene glycol ether, glycerol ethoxylates having a molecular weight of 200 to 20 000 g/mol, pentaerythritol alkoxylates having a molecular weight of 200 to 20 000 g/mol, or other ethoxylation and alkoxylation products, and random or block copolymers prepared by addition reaction of ethylene oxide and/or propylene oxides to monohydric and higher alcohols, having a molecular weight of 200 to 20 000 g/mol.

Figures for molecular weights of polymers are always based on their number-average molecular weight, unless indicated otherwise in any particular case. Molecular weights can be determined by GPC against polyethylene glycol as standard.

Further suitable auxiliaries in the aqueous pigment preparations of the invention are preferably water-soluble organic or hydrotropic substances, which optionally also serve as solvents. Particularly suitable, for example, are formamide, urea, tetramethylurea, ε-caprolactam, glycerol, diglycerol, polyglycerol, N-methylpyrrolidone, 1,3-diethyl-2-imidazolidinone, thiodiglycol, sodium benzenesulfonate, sodium xylenesulfonate, sodium toluenesulfonate, sodium cumenesulfonate, sodium dodecylsulfonate, sodium benzoate, sodium salicylate, and sodium butylmonoglycol sulfate.

Suitable defoamers are preferably mineral oil defoamers and emulsions thereof, silicone oil defoamers and silicone oil emulsions, polyalkylene glycols, polyalkylene glycol fatty acid esters, fatty acids, higher alcohols, phosphoric esters, hydrophobically modified silica, aluminum tristearate, polyethylene waxes, and amide waxes.

Suitable further rheological additives as agents for regulating the viscosity are, for example, starch derivatives and cellulose derivatives and hydrophobically modified ethoxylated urethane (HEUR) thickeners, alkali-swellable acrylate thickeners, hydrophobically modified acrylate thickeners, polymers of acrylamidomethylpropanesulfonic acid, or fumed silica.

In-can preservatives are added to stabilize the aqueous pigment preparations and to prevent the uncontrolled multiplication of bacteria, algae, and fungi. Suitable biocides are formaldehyde, formaldehyde donor compounds, methylisothiazolinone, chloromethylisothiazolinone, benzisothiazolinone, bronopol, dibromodicyanobutane, and silver chloride-coated titanium dioxide.

Buffer substances and pH regulators employed are preferably organic or inorganic bases and acids. Preferred organic bases are amines, such as ethanolamine, diethanolamine, triethanolamine, N,N-dimethylethanolamine, diisopropylamine, 2-amino-2-methyl-1-propanol, or dimethylaminomethylpropanol, for example. Preferred inorganic bases are sodium hydroxide, potassium hydroxide, and lithium hydroxide, or ammonia.

Water used in preparing the aqueous pigment preparations of the invention, component (G), is employed preferably in the form of distilled or demineralized water. Drinking water (mains water) as well, and/or water of natural origin, may be used. Water is present in the aqueous pigment preparation of the invention at preferably 10 to 75 wt %, more particularly at ad 100 wt %.

The aqueous pigment preparations of the invention preferably have a viscosity of 10 to 10 000 mPas, preferably 30 to 5000 mPas, and more preferably 50 to 3000 mPas, measured with a cone/plate viscometer at a shear rate of $1/60 \sec^{-1}$, e.g., with a Haake viscometer 550.

The aqueous pigment preparations of the invention are miscible with water in any proportion, and a plurality of different preparations can also be mixed with water. The preparations are notable, relative to conventional pigment preparations, for outstanding stability in storage, and good rheological properties.

The present invention also provides a method for producing the pigment preparations of the invention, by dispersing component (A) in the form of powder or granules in the presence of water (G) and also of components (B), (C), and optionally (D), (E), and (F) in a conventional way, then optionally admixing further water (G), and adjusting the resultant aqueous pigment dispersion with water to the desired concentration. The liquid components (B), (C), (G), and optionally (F) are preferably mixed and homogenized, then the solid, pulverulent, granulated, or flake-form component (A), (D), and (E) are stirred into the mixture introduced initially, with the pigment and optionally the fillers being pasted and subjected to preliminary dispersing. Depending on the harshness of the pigments used, this is followed by fine dispersion or fine distribution with the aid of a milling or dispersing assembly, optionally with cooling. For this purpose, use may be made of stirring mechanisms, dissolvers (sawtooth stirrers), rotor-stator mills, ball mills, agitated ball mills such as sand mills and bead mills, high-speed mixers, kneading apparatus, roll mills, or high-performance bead mills. The fine dispersing and/or milling of the pigments takes place until the desired particle size distribution is reached, and may be carried out at temperatures in the range from 0 to 100° C., usefully at a temperature between 10 and 70° C., preferably at 20 to 60° C. After fine dispersing has taken place, the pigment preparation may be diluted further with water, preferably deionized or distilled water.

The pigment preparations of the invention are suitable for pigmenting and coloring macromolecular materials of all kinds. In particular the pigment preparations of the invention are suitable for pigmenting and producing emulsion and other paints, dispersion-based varnishes, printing inks, including for example textile, flexographic, decorative or gravure printing inks, wallpaper inks, water-thinnable varnishes, wood stains, wood preservative systems, and coatings for the surface coating of articles made, for example, of metal, wood, plastic, glass, ceramic, concrete, textile material, paper, or rubber are of use.

A particular feature of the pigment preparations of the invention is their use as universal tinting pastes. Universal tinting pastes are suitable not only for coloring aqueous paints but also for tinting solventborne varnishes. Customary dispersants for aqueous pigment preparations stabilize the pigments only in aqueous systems, but not in solventborne systems. If aqueous pigment preparations are used for coloring solventborne varnishes, there may be agglomeration of the pigments and there may be floating of the agglomerated pigments in the varnish. On application of the varnishes by brush, roller, or by spray application, streakiness may be a result, as may also be an inconsistent painted outcome as a result of differences in shade, because the pigments undergo flocculation in the paint and during the drying process, and so the color strength is reduced. When the colored varnishes are applied, the pigment agglomerates are separated again, but to different extents, and hence the shade differences observed come about. In the laboratory, this phenomenon is simulated in the rubout test, which is described in U.S. Pat. No. 3,840,383.

EXAMPLES

Production of a Pigment Preparation

The pigment, in the form alternatively of powder, granules or presscake, is pasted in deionized water, together with the dispersants and the other additions, and then homogenized and subjected to preliminary dispersion, using a dissolver (e.g., from VMA-Getzmann GmbH, model AE3-M1) or another suitable apparatus.

For the purpose of dispersion, the liquid components (B), (C), and (F) are introduced into a grinding vessel and mixed. Then the pulverulent components (A) and optionally (D) and (E) are added and subjected to preliminary dispersion with the dissolver.

The subsequent fine dispersing takes place by means of a bead mill (e.g., the AE3-M1 from VMA-Getzmann) or else of another suitable dispersing assembly, with grinding taking place using siliquarzite beads or zirconium mixed oxide beads with a size of d=1 mm, accompanied by cooling, until the desired color strength and coloristic properties are obtained. The final pigment concentration desired is then set using deionized water, and the grinding media are separated off, and the pigment preparation is isolated.

Testing of Varnish Compatibility and Color Strength

The pigment preparation is stored at 60° C. for a week and inspected. The viscosity of the pigment preparation is measured at 25° C. using a Haake viscometer 550 at a shear rate of $1/60$ sec$^{-1}$ or, in the case of highly fluid pigment preparations, using a Brookfield viscometer, model DV-II, with spindle 3 at 100 rpm. For the determination of the color strength and the compatibility, the pigment preparations are added respectively to an aqueous white emulsion paint and to a mineral oil-containing long-oil alkyd varnish. For the testing of the color strength and compatibility, 200 g of each of the tinted paints, consisting of 92 wt % of base varnish and 8 wt % of the pigment preparation, are introduced into a metal can and homogenized for 60 seconds in an Inkshaker 500 from Olbrich Know-how, Hemer. After one day, the tinted paints are coated out onto a test card, using a 120 μm doctor blade on a film-drawing apparatus, model 509 MC, from Erichsen GmbH, Hemer. The rubout test is performed on the drying paint films in the manner described in the specification U.S. Pat. No. 3,840,383.

The pigment preparations described in the examples below were produced by the method described above, the following constituents being used in the stated amounts in such a way as to give 100 parts of each pigment preparation. In the present specification, "parts" means parts by weight and percentages are weight percentages, unless indicated otherwise in any specific case.

Examples of Pigment Preparations with Inorganic Pigments

Example 1

60.0 parts C.I. Pigment Red 101 (Bayferrox Red 130, Lanxess, component (A)),
2.5 parts a phosphoric ester of a $C_{16}/C_{18}$ alcohol polyalkylene glycol ether with 5 propylene glycol units and 6 ethylene glycol units (component (B)),
8.0 parts tall oil fatty acid ethanolamide reacted with 15 mol of ethylene oxide (Dispersogen® MT 150, Clariant, component (C)),
10.0 parts glycerol ethoxylate with a molecular weight of 300 g/mol (Polyglykol G 300, Clariant, component (F)),
0.3 parts defoamer (D-Foam-R C 740, Clariant, component (F)),
0.2 parts preservative (Nipacide® BSM, Clariant, component (F)),
19.0 parts water (component (G))

After storage for one week at 60° C., the pigment preparation is liquid, homogeneous, and foam-free. The viscosity of the pigment preparation is 979 mPa·s, measured using a Haake cone/plate viscometer. On further storage at 25° C. for 4 weeks, the pigment preparation remains homogeneous and suitable for use as tinting paste.

Example 2 (Comparative Example)

60.0 parts C.I. Pigment Red 101 (Bayferrox Red 130, Lanxess, component (A)),
8.3 parts 30% aqueous solution of a sodium cocoylglycinate (Hostapon® SG, Clariant, prior-art anionic dispersant),
8.0 parts tall oil fatty acid ethanolamide reacted with 15 mol of ethylene oxide (Dispersogen® MT 150, Clariant, component (C)),
10.0 parts glycerol ethoxylate with a molecular weight of 300 g/mol (Polyglykol G 300, Clariant, component (F)),
0.3 parts defoamer (D-Foam-R C 740, Clariant, component (F)),
0.2 parts preservative (Nipacide® BSM, Clariant, component (F)),
13.2 parts water (component (G))

The pigment preparation can be pasted up and fluidized. After grinding, the pigment preparation becomes a solid cake.

Example 3 (Comparative Example)

60.0 parts C.I. Pigment Red 101 (Bayferrox Red 130, Lanxess, component (A)),
8.3 parts 30% aqueous solution of an alkylpolyethylene glycol ether carboxylic acid, sodium salt (Dispersogen® ECS, Clariant, prior-art anionic dispersant),
8.0 parts tall oil fatty acid ethanolamide reacted with 15 mol of ethylene oxide (Dispersogen® MT 150, Clariant, component (C)),
10.0 parts glycerol ethoxylate with a molecular weight of 300 g/mol (Polyglykol G 300, Clariant, component (F)),
0.3 parts defoamer (D-Foam-R C 740, Clariant, component (F)),
0.2 parts preservative (Nipacide® BSM, Clariant, component (F)),
13.2 parts water (component (G))

The pigment preparation can be pasted up and fluidized. After grinding, the pigment preparation becomes a solid cake.

Example 4 (Comparative Example)

60.0 parts C.I. Pigment Red 101 (Bayferrox Red 130, Lanxess, component (A)),
0.9 parts Cocoalkylamine (Genamin® CC 100, Clariant, prior-art anionic dispersant),
8.0 parts tall oil fatty acid ethanolamide reacted with 15 mol of ethylene oxide (Dispersogen® MT 150, Clariant, component (C)),
10.0 parts glycerol ethoxylate with a molecular weight of 300 g/mol (Polyglykol G 300, Clariant, component (F)),
0.3 parts defoamer (D-Foam-R C 740, Clariant, component (F)),
0.2 parts preservative (Nipacide® BSM, Clariant, component (F)),
28.6 parts water (component (G))

The pigment preparation after grinding is a liquid dispersion. After storage at 60° C. for one week, the pigment preparation has formed a solid, sticky sediment. Following reagitation of the sediment, the viscosity is 363 mPa·s, measured with a Haake cone/plate viscometer at a shear rate of 1/60 sec$^{-1}$. On renewed storage, a sticky sediment is again formed.

Example 5

60.0 parts C.I. Pigment Black 11 (Bayferrox Black 316, Lanxess, component (A)),
2.5 parts a phosphoric ester of a $C_{16}/C_{18}$ alcohol polyalkylene glycol ether with 5 propylene glycol units and 6 ethylene glycol units (component (B)),
8.0 parts tall oil fatty acid ethanolamide reacted with 15 mol of ethylene oxide (Dispersogen® MT 150, Clariant, component (C)),
10.0 parts glycerol ethoxylate with a molecular weight of 300 g/mol (Polyglykol G 300, Clariant, component (F)),
0.3 parts defoamer (D-Foam-R C 740, Clariant, component (F)),
0.2 parts preservative (Nipacide® BSM, Clariant, component (F)),
19.0 parts water (component (G))

After storage for one week at 60° C., the pigment preparation is liquid, homogeneous, and foam-free. The viscosity of the pigment preparation is 1040 Pa·s, measured using a Haake cone/plate viscometer.

Example 6

60.0 parts al. Pigment Green 17 (Chrome Oxide Green GN, Lanxess, component (A)),
2.5 parts a phosphoric ester of a $C_{16}/C_{18}$ alcohol polyalkylene glycol ether with 5 propylene glycol units and 6 ethylene glycol units (component (B)),
8.0 parts tall oil fatty acid ethanolamide reacted with 15 mol of ethylene oxide (Dispersogen® MT 150, Clariant, component (C)),
10.0 parts glycerol ethoxylate with a molecular weight of 300 g/mol (Polyglykol G 300, Clariant, component (F)),
0.3 parts defoamer (D-Foam-R C 740, Clariant, component (F)),
0.2 parts preservative (Nipacide® BSM, Clariant, component (F)),
19.0 parts water (component (G))

After storage for one week at 60° C., the pigment preparation is liquid, homogeneous, and foam-free. The viscosity of the pigment preparation is 620 Pa·s, measured using a Haake cone/plate viscometer.

Example 7

60.0 parts C.I. Pigment Red 101 (Bayferrox Red 130, Lanxess, component (A)),
2.5 parts a phosphoric ester of a $C_{13}$ alcohol polyalkylene glycol ether with 6 ethylene glycol units (Hostaphat® 1306, Clariant, component (B)),
8.0 parts tall oil fatty acid ethanolamide reacted with 15 mol of ethylene oxide (Dispersogen® MT 150, Clariant, component (C)),
10.0 parts glycerol ethoxylate with a molecular weight of 300 g/mol (Polyglykol G 300, Clariant, component (F)),
0.3 parts defoamer (D-Foam-R C 740, Clariant, component (F)),
0.2 parts preservative (Nipacide® BSM, Clariant, component (F)),
19.0 parts water (component (G))

After storage for one week at 60° C., the pigment preparation is liquid, homogeneous, and foam-free. The viscosity of the pigment preparation is 460 mPa·s, measured using a Haake cone/plate viscometer. On further storage at 25° C. for 4 weeks, the pigment preparation remains homogeneous and suitable for use as tinting paste.

Example 8

60.0 parts C.I. Pigment Black 11 (Bayferrox Black 316, Lanxess, component (A)),
2.5 parts a phosphoric ester of a $C_{13}$ alcohol polyalkylene glycol ether with 6 ethylene glycol units (Hostaphat® 1306, Clariant, component (B)),
8.0 parts tall oil fatty acid ethanolamide reacted with 15 mol of ethylene oxide (Dispersogen® MT 150, Clariant, component (C)),
10.0 parts glycerol ethoxylate with a molecular weight of 300 g/mol (Polyglykol G 300, Clariant, component (F)),
0.3 parts defoamer (D-Foam-R C 740, Clariant, component (F)),
0.2 parts preservative (Nipacide® BSM, Clariant, component (F)),
19.0 parts water (component (G))

After storage for one week at 60° C., the pigment preparation is liquid, homogeneous, and foam-free. The viscosity of the pigment preparation is 1160 mPa·s, measured using a Haake cone/plate viscometer. On further storage at 25° C. for 4 weeks, the pigment preparation remains homogeneous and suitable for use as tinting paste.

Example 9

60.0 parts C.I. Pigment Blue 28 (Heucodor Blau 551, Heubach, component (A)),
2.5 parts a phosphoric ester of a $C_{16}/C_{18}$ fatty alcohol (Hostaphat® CS 120, Clariant, component (B)),
8.0 parts tall oil fatty acid ethanolamide reacted with 15 mol of ethylene oxide (Dispersogen® MT 150, Clariant, component (C)),
10.0 parts glycerol ethoxylate with a molecular weight of 300 g/mol (Polyglykol G 300, Clariant, component (F)),
0.3 parts defoamer (D-Foam-R C 740, Clariant, component (F)),
0.2 parts preservative (Nipacide® BSM, Clariant, component (F)),
19.0 parts water (component (G))

After storage for one week at 60° C., the pigment preparation is liquid, homogeneous, and foam-free. The viscosity of the pigment preparation is 850 mPa·s, measured using a Haake cone/plate viscometer. On further storage at 25° C. for 4 weeks, the pigment preparation remains homogeneous and suitable for use as tinting paste.

Example 10

60.0 parts C.I. Pigment Black 11 (Bayferrox Black 316, Lanxess, component (A)),
2.5 parts a phosphoric ester of a $C_{16}/C_{18}$ fatty alcohol (Hostaphat® CS 120, Clariant, component (B)),
8.0 parts tall oil fatty acid ethanolamide reacted with 15 mol of ethylene oxide (Dispersogen® MT 150, Clariant, component (C)),
10.0 parts glycerol ethoxylate with a molecular weight of 300 g/mol (Polyglykol G 300, Clariant, component (F)),
0.3 parts defoamer (D-Foam-R C 740, Clariant, component (F)),
0.2 parts preservative (Nipacide® BSM, Clariant, component (F)),
19.0 parts water (component (G))

After storage for one week at 60° C., the pigment preparation is liquid, homogeneous, and foam-free. The viscosity of the pigment preparation is 970 Pa·s, measured using a Haake cone/plate viscometer. On further storage at 25° C. for 4 weeks, the pigment preparation remains homogeneous and suitable for use as tinting paste.

Example 11

50.0 parts C.I. Pigment Black 11 (Bayferrox Black 316, Lanxess, component (A)),
2.5 parts a phosphoric ester of a $C_{12}/C_{14}$ fatty alcohol ethoxylate with 3 ethylene glycol units (Hostaphat® KL 340, Clariant, component (B)),
8.0 parts tall oil fatty acid ethanolamide reacted with 5 mol of ethylene oxide (Emulsogen® MT 050, Clariant, component (C)),
10.0 parts glycerol ethoxylate with a molecular weight of 300 g/mol (Polyglykol G 300, Clariant, component (F)),
0.3 parts defoamer (D-Foam-R C 740, Clariant, component (F)),
0.2 parts preservative (Nipacide® BSM, Clariant, component (F)),
29.0 parts water (component (G))

After storage for one week at 60° C., the pigment preparation is liquid, homogeneous, and foam-free. The viscosity of the pigment preparation is 1130 Pas, measured using a Haake cone/plate viscometer. On further storage at 25° C. for 4 weeks, the pigment preparation remains homogeneous and suitable for use as tinting paste.

Example 12

50.0 parts C.I. Pigment Black 11 (Bayferrox Black 316, Lanxess, component (A)),
2.5 parts a phosphoric ester of a $C_{12}/C_{14}$ fatty alcohol ethoxylate with 3 ethylene glycol units (Hostaphat® KL 340, Clariant, component (B)),
8.0 parts tall oil fatty acid ethanolamide reacted with 15 mol of ethylene oxide (Dispersogen® MT 150, Clariant, component (C)),
10.0 parts glycerol ethoxylate with a molecular weight of 300 g/mol (Polyglykol G 300, Clariant, component (F)),
0.3 parts defoamer (D-Foam-R C 740, Clariant, component (F)),
0.2 parts preservative (Nipacide® BSM, Clariant, component (F)),
29.0 parts water (component (G))

After storage for one week at 60° C., the pigment preparation is liquid, homogeneous, and foam-free. The viscosity of the pigment preparation is 700 Pa·s, measured using a Haake cone/plate viscometer. On further storage at 25° C. for 4 weeks, the pigment preparation remains homogeneous and suitable for use as tinting paste.

Example 13

50.0 parts C.I. Pigment Black 11 (Bayferrox Black 316, Lanxess, component (A)),
2.5 parts a phosphoric ester of a $C_{12}/C_{14}$ fatty alcohol ethoxylate with 3 ethylene glycol units (Hostaphat® KL 340, Clariant, component (B)),
8.0 parts tall oil fatty acid ethanolamide reacted with 30 mol of ethylene oxide component (C)),
10.0 parts glycerol ethoxylate with a molecular weight of 300 g/mol (Polyglykol G 300, Clariant, component (F)),
0.3 parts defoamer (D-Foam-R C 740, Clariant, component (F)),
0.2 parts preservative (Nipacide® BSM, Clariant, component (F)),
29.0 parts water (component (G))

After storage for one week at 60° C., the pigment preparation is liquid, homogeneous, and foam-free. The viscosity of the pigment preparation is 230 Pa·s, measured using a Haake cone/plate viscometer. On further storage at 25° C. for 4 weeks, the pigment preparation remains homogeneous and suitable for use as tinting paste.

Examples of Pigment Preparations with Organic Pigments

Example 14

21.0 parts C.I. Pigment Blue 15:3 (Hostaperm® Blue B2G, Clariant, component (A)),
2.5 parts a phosphoric ester of a $C_{16}/C_{18}$ alcohol polyalkylene glycol ether with 5 propylene glycol units and 6 ethylene glycol units (component (B)),
6.0 parts tall oil fatty acid ethanolamide reacted with 15 mol of ethylene oxide (Dispersogen® MT 150, Clariant, component (C)),
2.0 parts montmorillonite clay mineral thickener and antisettling agent
(Ceratofix® VP, Clariant, component (D)),
18.0 parts barium sulfate (blanc fixe micro, Sachtleben, component (E)),
10.0 parts glycerol ethoxylate with a molecular weight of 300 g/mol (Polyglykol 300, Clariant, component (F)),
0.3 parts defoamer (D-Foam-R C 740, Clariant, component (F)),
0.2 parts preservative (Nipacide® BSM, Clariant, component (F)),
40.0 parts water (component (G))

After storage for one week at 60° C., the pigment preparation is liquid, homogeneous, and foam-free. The viscosity of the pigment preparation is 1230 mPa·s, measured using a Brookfield viscometer by means of spindle 3 at 100 rpm. The long-oil alkyd varnish and the white emulsion paint tinted with the pigment paste do not show any rubout. On further storage at 25° C. for 4 weeks, the pigment preparation remains homogeneous and suitable for use as tinting paste.

Example 15

6.0 parts C.I. Pigment Black 7 (Special Black 4, Evonik, component (A)),
2.5 parts a phosphoric ester of a $O_{16}/O_{18}$ alcohol polyalkylene glycol ether with 5 propylene glycol units and 6 ethylene glycol units (component (B)),
6.0 parts tall oil fatty acid ethanolamide reacted with 15 mol of ethylene oxide (Dispersogen® MT 150, Clariant, component (C)),
1.0 part montmorillonite clay mineral thickener and antisettling agent (Ceratofix® VP, Clariant, component (D)),
26.0 parts barium sulfate (blanc fixe micro, Sachtleben, component (E)),
10.0 parts glycerol ethoxylate with a molecular weight of 300 g/mol (Polyglykol 300, Clariant, component (F)),
0.3 parts defoamer (D-Foam-R C 740, Clariant, component (F)),
0.2 parts preservative (Nipacide® BSM, Clariant, component (F)),
48.0 parts water (component (G))

After storage for one week at 60° C., the pigment preparation is liquid, homogeneous, and foam-free. The viscosity of the pigment preparation is 32 mPa·s, measured using a Brookfield viscometer by means of spindle 3 at 100 rpm. The long-oil alkyd varnish and the white emulsion paint tinted with the pigment paste do not show any rubout. On further storage at 25° C. for 4 weeks, the pigment preparation remains homogeneous and suitable for use as tinting paste.

Example 16

2.0 parts C.I. Pigment Violet 23 (Hostaperm® Violet RL 02, Clariant, component (A)),
2.5 parts a phosphoric ester of a $C_{16}/C_{18}$ alcohol polyalkylene glycol ether with 5 propylene glycol units and 6 ethylene glycol units (component (B)),
6.0 parts tall oil fatty acid ethanolamide reacted with 15 mol of ethylene oxide (Dispersogen® MT 150, Clariant, component (C)),
2.0 parts montmorillonite clay mineral thickener and antisettling agent (Ceratofix® VP, Clariant, component (D)),
29.0 parts barium sulfate (blanc fixe micro, Sachtleben, component (E)),
10.0 parts glycerol ethoxylate with a molecular weight of 300 g/mol (Polyglykol 300, Clariant, component (F)),
0.3 parts defoamer (D-Foam-R C 740, Clariant, component (F)),
0.2 parts preservative (Nipacide® BSM, Clariant, component (F)),
48.0 parts water (component (G))

After storage for one week at 60° C., the pigment preparation is liquid, homogeneous, and foam-free. The viscosity of the pigment preparation is 90 mPa·s, measured using a Brookfield viscometer by means of spindle 3 at 100 rpm. The long-oil alkyd varnish and the white emulsion paint tinted with the pigment paste do not show any rubout. On further storage at 25° C. for 4 weeks, the pigment preparation remains homogeneous and suitable for use as tinting paste.

Example 17

13.0 parts C.I. Pigment Red 112 (Permanent® Red FGR, Clariant, component (A)),
2.5 parts a phosphoric ester of a $C_{16}/C_{18}$ alcohol polyalkylene glycol ether with 5 propylene glycol units and 6 ethylene glycol units (component (B)),
6.0 parts tall oil fatty acid ethanolamide reacted with 15 mol of ethylene oxide (Dispersogen® MT 150, Clariant, component (C)),
2.0 parts montmorillonite clay mineral thickener and antisettling agent (Ceratofix® VP, Clariant, component (D)),
25.0 parts barium sulfate (blanc fixe micro, Sachtleben, component (E)),
10.0 parts glycerol ethoxylate with a molecular weight of 300 g/mol (Polyglykol 300, Clariant, component (F)),
0.3 parts defoamer (D-Foam-R C 740, Clariant, component (F)),
0.2 parts preservative (Nipacide® BSM, Clariant, component (F)),
41.0 parts water (component (G))

After storage for one week at 60° C., the pigment preparation is liquid, homogeneous, and foam-free. The viscosity of the pigment preparation is 200 mPa·s, measured using a Brookfield viscometer by means of spindle 3 at 100 rpm. The long-oil alkyd varnish and the white emulsion paint tinted with the pigment paste do not show any rubout. On further storage at 25° C. for 4 weeks, the pigment preparation remains homogeneous and suitable for use as tinting paste.

Example 18

21.0 parts C.I. Pigment Blue 15:3 (Hostaperm® Blue B2G, Clariant, component (A)),
2.5 parts a phosphoric ester of a $C_{13}$ alcohol polyalkylene glycol ether with 6 ethylene glycol units (Hostaphat® 1306, Clariant, component (B)),
6.0 parts tall oil fatty acid ethanolamide reacted with 15 mol of ethylene oxide (Dispersogen® MT 150, Clariant, component (C)),
2.0 parts montmorillonite clay mineral thickener and antisettling agent (Ceratofix® VP, Clariant, component (D)),
18.0 parts barium sulfate (blanc fixe micro, Sachtleben, component (E)),
10.0 parts glycerol ethoxylate with a molecular weight of 300 g/mol (Polyglykol 300, Clariant, component (F)),
0.3 parts defoamer (D-Foam-R C 740, Clariant, component (F)),
0.2 parts preservative (Nipacide® BSM, Clariant, component (F)),
40.0 parts water (component (G))

After storage for one week at 60° C., the pigment preparation is liquid, homogeneous, and foam-free. The viscosity of the pigment preparation is 520 mPa·s, measured using a Brookfield viscometer by means of spindle 3 at 100 rpm. The long-oil alkyd varnish and the white emulsion paint tinted with the pigment paste do not show any rubout. On further storage at 25° C. for 4 weeks, the pigment preparation remains homogeneous and suitable for use as tinting paste.

Example 19

6.0 parts C.I. Pigment Black 7 (Special Black 4, Evonik, component (A)),
2.5 parts a phosphoric ester of a $C_{13}$ alcohol polyalkylene glycol ether with 6 ethylene glycol units (Hostaphat® 1306, Clariant, component (B)),
6.0 parts tall oil fatty acid ethanolamide reacted with 15 mol of ethylene oxide (Dispersogen® MT 150, Clariant, component (C)), 1.0 part montmorillonite clay mineral thickener and antisettling agent (Ceratofix® VP, Clariant, component (D)),
26.0 parts barium sulfate (blanc fixe micro, Sachtleben, component (E)),
10.0 parts glycerol ethoxylate with a molecular weight of 300 g/mol (Polyglykol 300, Clariant, component (F)),
0.3 parts defoamer (D-Foam-R C 740, Clariant, component (F)),
0.2 parts preservative (Nipacide® BSM, Clariant, component (F)),
48.0 parts water (component (G))

After storage for one week at 60° C., the pigment preparation is liquid, homogeneous, and foam-free. The viscosity of the pigment preparation is 46 mPa·s, measured using a Brookfield viscometer by means of spindle 3 at 100 rpm. The long-oil alkyd varnish and the white emulsion paint tinted with the pigment paste do not show any rubout. On further storage at 25° C. for 4 weeks, the pigment preparation remains homogeneous and suitable for use as tinting paste.

Example 20

2.0 parts C.I. Pigment Violet 23 (Hostaperm® Violet RL 02, Clariant, component (A)),
2.5 parts a phosphoric ester of a $C_{13}$ alcohol polyalkylene glycol ether with 6 ethylene glycol units (Hostaphat® 1306, Clariant, component (B)),
6.0 parts tall oil fatty acid ethanolamide reacted with 15 mol of ethylene oxide (Dispersogen® MT 150, Clariant, component (C)),
3.0 parts montmorillonite clay mineral thickener and antisettling agent (Ceratofix® VP, Clariant, component (D)),
29.0 parts barium sulfate (blanc fixe micro, Sachtleben, component (E)),
10.0 parts glycerol ethoxylate with a molecular weight of 300 g/mol (Polyglykol 300, Clariant, component (F)),
0.3 parts defoamer (D-Foam-R C 740, Clariant, component (F)),
0.2 parts preservative (Nipacide® BSM, Clariant, component (F)),
47.0 parts water (component (G))

After storage for one week at 60° C., the pigment preparation is liquid, homogeneous, and foam-free. The viscosity of the pigment preparation is 58 mPa·s, measured using a Brookfield viscometer by means of spindle 3 at 100 rpm. The long-oil alkyd varnish and the white emulsion paint tinted with the pigment paste do not show any rubout. On further storage at 25° C. for 4 weeks, the pigment preparation remains homogeneous and suitable for use as tinting paste.

Example 21

13.0 parts C.I. Pigment Red 112 (Permanent® Red FGR, Clariant, component (A)),
2.5 parts a phosphoric ester of a $C_{13}$ alcohol polyalkylene glycol ether with 6 ethylene glycol units (Hostaphat® 1306, Clariant, component (B)),
6.0 parts tall oil fatty acid ethanolamide reacted with 15 mol of ethylene oxide (Dispersogen® MT 150, Clariant, component (C)),
3.0 parts montmorillonite clay mineral thickener and antisettling agent (Ceratofix® VP, Clariant, component (D)),
25.0 parts barium sulfate (blanc fixe micro, Sachtleben, component (E)),
10.0 parts glycerol ethoxylate with a molecular weight of 300 g/mol (Polyglykol 300, Clariant, component (F)),
0.3 parts defoamer (D-Foam-R C 740, Clariant, component (F)),
0.2 parts preservative (Nipacide® BSM, Clariant, component (F)),
40.0 parts water (component (G))

After storage for one week at 60° C., the pigment preparation is liquid, homogeneous, and foam-free. The viscosity of the pigment preparation is 150 mPa's, measured using a Brookfield viscometer by means of spindle 3 at 100 rpm. The long-oil alkyd varnish and the white emulsion paint tinted with the pigment paste do not show any rubout. On further storage at 25° C. for 4 weeks, the pigment preparation remains homogeneous and suitable for use as tinting paste.

Example 22

13.0 parts C.I. Pigment Red 112 (Permanent® Red FGR, Clariant, component (A)),
2.5 parts a phosphoric ester of a $C_{16}/C_{18}$ fatty alcohol (Hostaphat® CS 120, Clariant, component (B)),
6.0 parts tall oil fatty acid ethanolamide reacted with 15 mol of ethylene oxide (Dispersogen® MT 150, Clariant, component (C)),
3.0 parts montmorillonite clay mineral thickener and antisettling agent (Ceratofix® VP, Clariant, component (D)),
25.0 parts barium sulfate (blanc fixe micro, Sachtleben, component (E)),
10.0 parts glycerol ethoxylate with a molecular weight of 300 g/mol (Polyglykol 300, Clariant, component (F)),
0.3 parts defoamer (D-Foam-R C 740, Clariant, component (F)),
0.2 parts preservative (Nipacide® BSM, Clariant, component (F)),
40.0 parts water (component (G))

After storage for one week at 60° C., the pigment preparation is liquid, homogeneous, and foam-free. The viscosity of the pigment preparation is 980 mPa·s, measured using a Brookfield viscometer by means of spindle 3 at 100 rpm. The long-oil alkyd varnish and the white emulsion paint tinted with the pigment paste do not show any rubout. On further storage at 25° C. for 4 weeks, the pigment preparation remains homogeneous and suitable for use as tinting paste.

Example 23

2.0 parts C.I. Pigment Violet 23 (Hostaperm® Violet RL 02, Clariant, component (A)),
2.5 parts a phosphoric ester of a $C_{16}/C_{18}$ fatty alcohol (Hostaphat® CS 120, Clariant, component (B)),
6.0 parts tall oil fatty acid ethanolamide reacted with 15 mol of ethylene oxide (Dispersogen® MT 150, Clariant, component (C)),
3.0 parts montmorillonite clay mineral thickener and antisettling agent (Ceratofix® VP, Clariant, component (D)),
29.0 parts barium sulfate (blanc fixe micro, Sachtleben, component (E)),
10.0 parts glycerol ethoxylate with a molecular weight of 300 g/mol (Polyglykol 300, Clariant, component (F)),
0.3 parts defoamer (D-Foam-R C 740, Clariant, component (F)),
0.2 parts preservative (Nipacide® BSM, Clariant, component (F)),
47.0 parts water (component (G))

After storage for one week at 60° C., the pigment preparation is liquid, homogeneous, and foam-free. The viscosity of the pigment preparation is 90 mPa·s, measured using a Brookfield viscometer by means of spindle 3 at 100 rpm. The long-oil alkyd varnish and the white emulsion paint tinted with the pigment paste do not show any rubout. On further storage at 25° C. for 4 weeks, the pigment preparation remains homogeneous and suitable for use as tinting paste.

Example 24 (Comparative Example)

50.0 parts C.I. Pigment Black 11 (Bayferrox Black 316, Lanxess, component (A)),
8.0 parts tall oil fatty acid ethanolamide reacted with 15 mol of ethylene oxide (Dispersogen® MT 150, Clariant, component (C)),
10.0 parts glycerol ethoxylate with a molecular weight of 300 g/mol (Polyglykol 300, Clariant, component (F)),
0.3 parts defoamer (D-Foam-R C 740, Clariant, component (F)),
0.2 parts preservative (Nipacide® BSM, Clariant, component (F)),
31.5 parts water (component (G))

After storage for one week at 60° C., the pigment preparation is liquid, homogeneous, and foam-free. The viscosity of the pigment preparation is 380 mPa·s, measured using a Haake cone/plate viscometer at a shear rate of 1/60 sec$^{-1}$. The white emulsion paint tinted with the pigment paste shows no rubout, whereas the long-oil alkyd varnish tinted with the pigment paste shows severe rubout. On further storage at 25° C. for 4 weeks, the pigment preparation remains homogeneous and suitable for use as tinting paste for aqueous paints.

Example 25 (Comparative Example)

50.0 parts C.I. Pigment Yellow 3920 (Bayferrox Yellow 3920, Lanxess, component (A)),
8.0 parts oleyl ethoxylate with 8 mol of ethylene oxide (Genapol® O 080, Clariant, component (C)),
10.0 parts glycerol ethoxylate with a molecular weight of 300 g/mol (Polyglykol 300, Clariant, component (F)),
0.3 parts defoamer (D-Foam-R C 740, Clariant, component (F)),
0.2 parts preservative (Nipacide® BSM, Clariant, component (F)),
31.5 parts water (component (G))

After storage for one week at 60° C., the pigment preparation is pasty and of high viscosity, and cannot be metered as a tinting paste. The viscosity of the pigment preparation is outside the measurement range of the customary measuring instruments, and cannot be determined.

The comparative examples above show the significance of the combination of components B and C in accordance with the invention. Pigment preparations of suitable viscosity can be produced using the combination of components B and C in accordance with the invention, but not using B alone. The pigment preparations of the invention which comprise components B and C largely exhibit good compatibility and no rubout in the tinting of aqueous and solventborne paints and inks.

The phosphoric esters used as component B in the examples contained a hydrogen atom as counterion M.

The invention claimed is:
1. An aqueous, binder-free pigment preparation comprising
  (A) 1.0 to 75.0 wt % of at least one organic or inorganic white or chromatic pigment or a mixture of different organic and inorganic white or chromatic pigments,
  (B) 0.01 to 8.0 wt % of at least one phosphoric ester of the formula (IV),

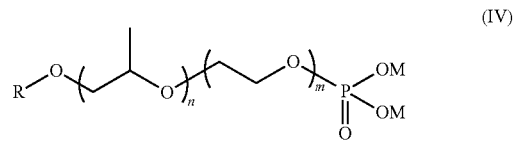

in which
  R is a linear or branched, saturated or unsaturated $C_8$ to $C_{18}$ aliphatic hydrocarbon radical,
  M is a hydrogen atom or a sodium, potassium, or ammonium ion,
  n is an integer from 0 to 20, and
  m is an integer from 0 to 20,
  (C) 0.01 to 12.0 wt % of a nonionic surfactant, which is a fatty acid ethanolamide ethoxylate of the formula (V),

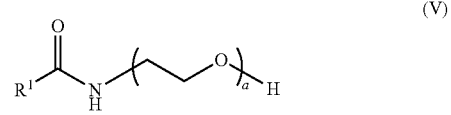

in which a is an integer from 3 to 50 and $R^1$ is $C_7$ to $C_{21}$ alkyl or alkenyl, and
  (G) water.

2. The aqueous, binder-free pigment preparation as claimed in claim 1, wherein R is an alkyl or alkenyl radical.

3. The aqueous, binder-free pigment preparation as claimed in claim 1, wherein m and n are simultaneously zero.

4. The aqueous, binder-free pigment preparation as claimed in claim 1, wherein n is zero and m is a number from 1 to 20.

5. The aqueous, binder-free pigment preparation as claimed in claim 1, wherein component (B) is a compound alkoxylated blockwise on the alcohol residue R—O first with 1 to 20 mol of propylene oxide and then with 1 to 20 mol of ethylene oxide.

6. The aqueous, binder-free pigment preparation as claimed in claim 1, wherein component (C) comprises ethoxylated $C_8$ to $C_{22}$ fatty acid alkanolamides having 1 to 100 ethoxy groups and a $C_2$ to $C_6$ alkanol radical.

7. The aqueous, binder-free pigment preparation as claimed in claim 1, comprising 1 to 12 wt % of a fatty acid alkanolamide ethoxylate of the formula (V).

8. The aqueous, binder-free pigment preparation as claimed in claim 1, comprising 1 to 7 wt % of a phosphoric ester of the formula (IV).

9. The aqueous, binder-free pigment preparation as claimed in claim 1, comprising 10 to 75 wt % of water.

10. The aqueous, binder-free pigment preparation as claimed in claim 1, which has a viscosity of 10 to 10 000 mPas, determined with a cone/plate viscometer at a shear rate of 1/60 sec−1.

11. The aqueous, binder-free pigment preparation as claimed in claim 1, further comprising
  (D) 0.01-8.0 wt % of clay mineral thickeners selected from the group consisting of natural or alkali-activated montmorillonite phyllosilicate minerals.

12. The aqueous, binder-free pigment preparation as claimed in claim 1, further comprising
  (E) 0.01-20.0 wt % of inorganic fillers.

13. The aqueous, binder-free pigment preparation as claimed in claim 1, further comprising (F) 0.01 to 30 wt % of other auxiliaries customary for producing aqueous, binder-free pigment preparations and selected from the group consisting of wetting agents, moisture retainers, solvents, defoamers, rheological additives, preservatives, buffer substances, and pH regulators.

14. The aqueous, binder-free pigment preparation as claimed in claim 13, comprising up to 15 wt % of at least one moisture retainer or solvent, selected from the group consisting of glycol ethers having 200 to 20 000 g/mol number-average molecular weight.

15. The aqueous, binder-free pigment preparation as claimed in claim 13, comprising up to 2 wt % of defoamers.

16. The aqueous, binder-free pigment preparation as claimed in claim 13, comprising up to 1 wt % of an in-can preservative.

17. A process for coloring a macromolecular material, coating material, paint, or, comprising the step of adding at least one aqueous, binder-free pigment preparation comprising
(A) 1.0 to 75.0 wt % of at least one organic or inorganic white or chromatic pigment or a mixture of different organic and inorganic white or chromatic pigments,
(B) 0.01 to 8.0 wt % of at least one phosphoric ester of the formula (IV),

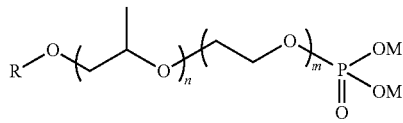

(IV)

in which
R is a linear or branched, saturated or unsaturated $C_8$ to $C_{18}$ aliphatic hydrocarbon radical,
M is a hydrogen atom or a sodium, potassium, or ammonium ion,
n is an integer from 0 to 20, and
m is an integer from 0 to 20,
(C) 0.01 to 12.0 wt % of a nonionic surfactant, which is a fatty acid ethanolamide ethoxylate of the formula (V),

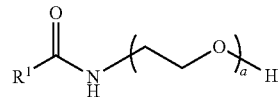

(V)

in which a is an integer from 3 to 50 and $R^1$ is $C_7$ to $C_{21}$ alkyl or alkenyl, and
(G) water to the macromolecular material, coating material, paint, or ink.

18. A macromolecular material, coating material, paint or ink, comprising at least one aqueous, binder-free pigment preparation as claimed in claim 1.

19. A process for printing a two-dimensional sheet structure comprising the step of contacting the two-dimensional sheet structure with at least one macromolecular material, coating material, paint or ink, as claimed in claim 18.

* * * * *